US012579117B2

(12) United States Patent
Van Den Akker et al.

(10) Patent No.: US 12,579,117 B2
(45) Date of Patent: *Mar. 17, 2026

(54) VARIANT IDENTIFICATION BY UNIQUE DATA SET DETECTION

(71) Applicant: Color Health, Inc., Burlingame, CA (US)

(72) Inventors: Hieronymus H. Van Den Akker, Palo Alto, CA (US); Asha Rostamianfar, Kitchener (CA); Zachary Langley, San Francisco, CA (US)

(73) Assignee: Color Health, Inc., Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,990

(22) Filed: Apr. 29, 2024

(65) Prior Publication Data

US 2024/0281421 A1     Aug. 22, 2024

Related U.S. Application Data

(63) Continuation of application No. 17/561,489, filed on Dec. 23, 2021, now Pat. No. 11,995,051.

(Continued)

(51) Int. Cl.
*G06F 16/215*          (2019.01)
*G06F 16/2458*        (2019.01)

(52) U.S. Cl.
CPC ........ *G06F 16/215* (2019.01); *G06F 16/2474* (2019.01)

(58) Field of Classification Search
CPC .............................. G06F 16/215; G06F 16/24
See application file for complete search history.

(56) References Cited

U.S. PATENT DOCUMENTS

2014/0336951 A1     11/2014   Coon et al.
2015/0132763 A1     5/2015    Amorese et al.
(Continued)

FOREIGN PATENT DOCUMENTS

CN          114549072 A       5/2022

OTHER PUBLICATIONS

Notice of Allowance for U.S. Appl. No. 17/561,489, dated Jan. 24, 2023.
(Continued)

*Primary Examiner* — Maher N Algibhah
(74) *Attorney, Agent, or Firm* — Mughal Gaudry & Franklin PC

(57)                ABSTRACT

Embodiments disclosed herein generally relate to detecting variants in a data set. A variant-specific unique data set, which includes a variant-inclusive portion that includes a particular variant and one or more other portions is accessed. The variant-specific unique data set corresponds to a particular region of a reference data set. A plurality of reads is received, with each read of the plurality of reads having been generated by processing a material collected from a subject. For each read of a subset of the plurality of reads, a first matching criterion and a second matching criterion can be determined to be satisfied, with the first matching criterion being more stringent than the second matching criterion. A data set associated with the subject can be determined to include the particular variant based on a quantity of reads in the subset. A result identified based on the particular variant can be output.

20 Claims, 6 Drawing Sheets

Related U.S. Application Data

(60) Provisional application No. 63/133,646, filed on Jan. 4, 2021.

(56) References Cited

U.S. PATENT DOCUMENTS

| | | | |
|---|---|---|---|
| 2016/0333401 A1 | 11/2016 | Breu et al. | |
| 2019/0277726 A1* | 9/2019 | Correia | F03D 80/50 |
| 2020/0075124 A1 | 3/2020 | Zhao et al. | |
| 2020/0168298 A1 | 5/2020 | Sahinalp et al. | |
| 2020/0332364 A1 | 10/2020 | Jessen | |
| 2021/0102199 A1 | 4/2021 | Jiang | |
| 2022/0119876 A1 | 4/2022 | Salk et al. | |
| 2023/0167505 A1 | 6/2023 | Samuelsz et al. | |

OTHER PUBLICATIONS

Office Action for U.S. Appl. No. 17/561,489, dated Jun. 12, 2023.

* cited by examiner

| Variant Type | Distinct Variants | Total Variant Count |
|---|---|---|
| Single Nucleotide Variant | 56 | 333 (100% detected) |
| Insertion/Deletion | 42 | 143 (100%) |
| Deletion | 53 | 102 (100%) |
| Duplication | 12 | 16 (100%) |
| Insertion | 1 | 6 (100%) |
| Inversion | 1 | 5 (100%) |
| Gene Conversion | 1 | 1 (100%) |
| Total | 166 | 606 |

FIG. 3

| Variant Type | Distinct Variants | Total Variant Count |
|---|---|---|
| Single Nucleotide Variant | 859 | 2102 (99.81%) |
| Deletion | 394 | 720 (99.31%) |
| Deletion with Insertion | 108 | 194 (98.45%) |
| Duplication | 116 | 188 (100%) |
| Duplication with Insertion | 22 | 38 (97.37%) |
| Insertion | 26 | 81 (100%) |
| Inversion | 6 | 18 (100%) |
| Total | 1531 | 3341 (99.61%) |

Align data set read to reference data set

510

Generate candidate data sets for a variant-specific unique data set from the read using a sliding window

515

Select candidate data set as variant-specific unique data set based on criteria

520

Store variant-specific unique data set

VARIANT IDENTIFICATION BY UNIQUE DATA SET DETECTION

CROSS-REFERENCES TO RELATED APPLICATIONS

The application is a continuation of U.S. Non-Provisional application Ser. No. 17/561,489, filed on Dec. 23, 2021, which claims priority to U.S. Provisional Application No. 63/133,646, filed on Jan. 4, 2021, each of which is hereby incorporated by reference in its entirety for all purposes.

BACKGROUND OF THE INVENTION

Various systems and methods are available for detecting variants in a data set compared to a reference data set. While many variants are known, conventional approaches typically do not systematically check for the catalogued presence of known variants. Instead, conventional approaches involve aligning reads to the reference data set and utilizing multiple algorithms to detect differences with respect to the reference data set. That is, rather than querying a data set for any of a library of variants, conventional techniques typically first identify regions where a data set does not match a reference data set and then characterizes the mismatch as a particular variant. This may introduce a messy data set of true and false positive variants, as well as partially overlapping variant instances. Moreover, relevant variant instances may be missed, resulting in false negative results. Accordingly, new systems, methods, and other techniques for accurately identifying variants in a data set are needed.

BRIEF SUMMARY OF THE INVENTION

A method is disclosed herein for detecting variants in a data set. The method may include accessing a variant-specific unique data set. The variant-specific unique data set is unique in that the reference data set does not include the variant-specific unique data set. The variant-specific unique data set can include a variant-inclusive portion that includes a particular variant and one or more other portions. The variant-specific unique data set can correspond to a particular region of a reference data set. The method may also include receiving a plurality of reads, each read of the plurality of reads having been generated by processing a material collected from a subject. The method may further include, for each read of a subset of the plurality of reads, determining that a first matching criterion is satisfied based on a comparison between data points in the variant-inclusive portion of the variant-specific unique data set and a contiguous plurality of data points in the read. The first matching criterion may be defined to require that each data point in the variant-specific unique data set matches an aligned data point in the read. Additionally, the method may include, for each read of the subset of the plurality of reads, determining that a second matching criterion is satisfied based on a comparison between data points in the one or more other portions of the variant-specific unique data set and one or more other contiguous pluralities of data points in the read. The first matching criterion can be more stringent than the second matching criterion. The method may further include determining a data set associated with the subject includes the particular variant based on a quantity of reads in the subset and outputting a result identified based on the particular variant.

The method may also include, for each read in the subset of the plurality of reads, determining that the read or a corresponding mate of the read was aligned to at least part of the particular region of the reference data set.

The method may further include identifying a length range for the variant-inclusive portion and for each of the one or more other portions.

In some embodiments, the determination that the data set associated with the subject includes the particular variant may be further based on a quantity and/or quality of reads that were aligned to at least part of the particular region and for which the first matching criterion and/or the second matching criterion were not satisfied. The determination that the data set associated with the subject includes the particular variant may alternatively be based on a quantity of reads in another subset, wherein, for each read in the other subset, multiple matching criteria were determined to be satisfied based on comparing data points in another variant-specific unique data set to data points in the read.

In some embodiments, the method includes, for each read of another subset of the plurality of reads, determining that the read aligns, at least in part, to another particular region of the reference data set and determining that a first matching criterion is satisfied based on a comparison between data points in the variant-inclusive portion of the variant-specific unique data set and data points in the read aligned to positions corresponding to the variant-inclusive portion. The method may further include determining that a second matching criterion is satisfied based on a comparison between data points in the one or more other portions of the variant-specific unique data set and data points in the read aligned to positions corresponding to the one or more other portions.

In some embodiments, the method may further include, prior to accessing the variant-specific unique data set, defining the variant-specific unique data set by detecting a variant within a portion of the reference data set based on an analysis of an additional material. The method may further include generating a plurality of candidate data sets for the variant-specific unique data set from the variant. Each of the plurality of candidate data sets can include a representation of at least part of the variant, and each candidate data set of the plurality of candidate data sets can differ from other candidate data sets in the plurality of candidate data sets with respect to a number of data points included in each of one or more portions of the candidate data set. The method may further include selecting a candidate data set among the plurality of candidate data sets as the variant-specific unique data set based on predefined criteria and storing the variant-specific unique data set.

Some embodiments of the present disclosure include a system including one or more data processors. In some embodiments, the system includes a non-transitory computer readable storage medium containing instructions which when executed on the one or more data processors, cause the one or more data processors to perform part of all of one or more methods and/or part or all of one or more processes disclosed herein. Some embodiments of the present disclosure include a computer-program product tangibly embodied in a non-transitory machine-readable storage medium including instructions configured to cause one or more data processors to perform part of all of one or more methods and/or part or all of one or more processes disclosed herein.

BRIEF DESCRIPTION OF THE DRAWINGS

The present disclosure is described in conjunction with the appended figures:

FIG. 3 demonstrates exemplary results of detecting variants in a data set, in accordance with some embodiments;

FIG. 4 demonstrates exemplary results of detecting variants in another data set, in accordance with some embodiments;

Figure 1:
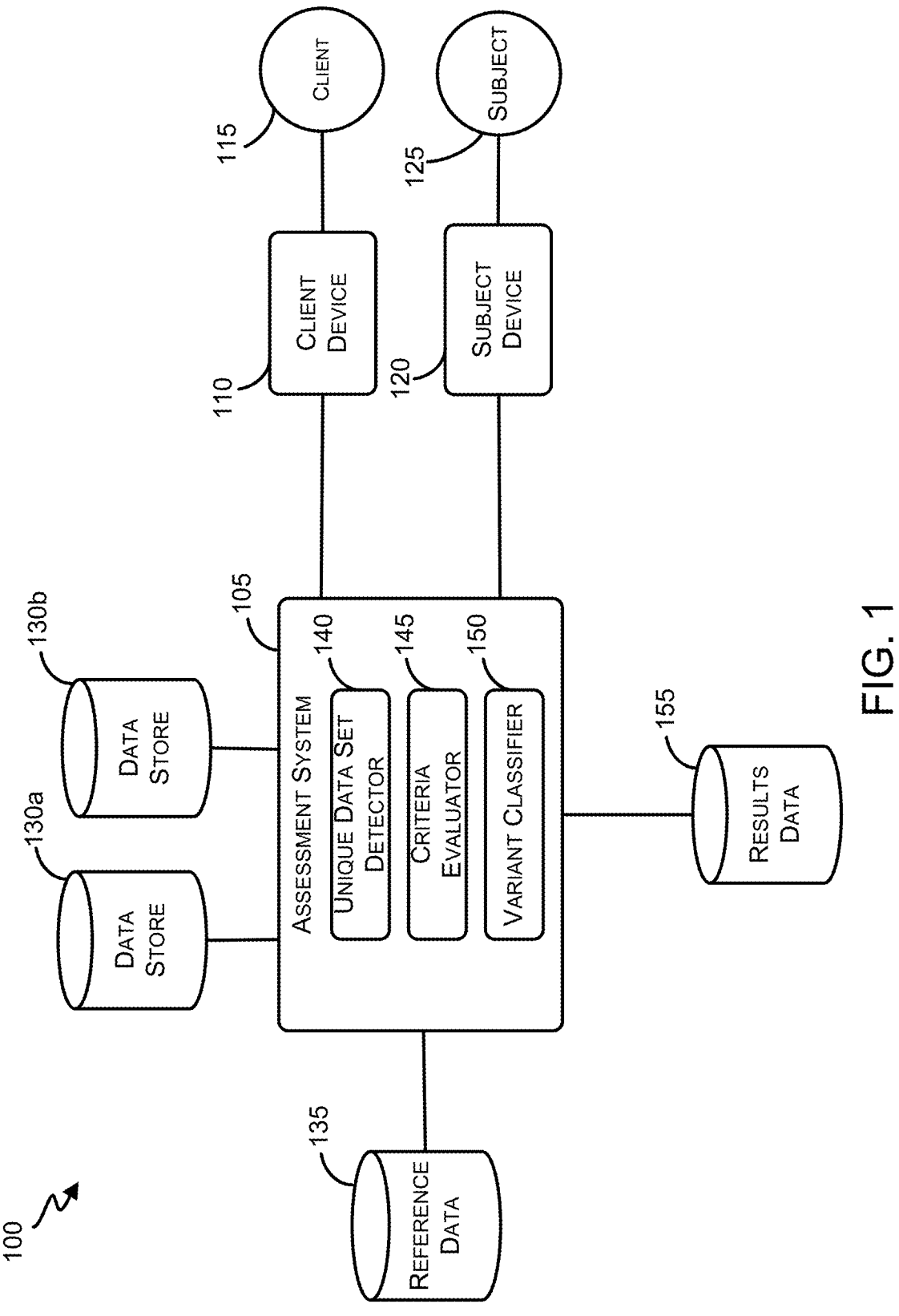
FIG. 1 shows a representation of an assessment network, in accordance with some embodiments of the invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE
INVENTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Embodiments of the present disclosure relate to a methodology to facilitate efficiently screening for any of a library of variants in a data set. By searching for the data sets that are unique to each variant, a single algorithm may call all subtypes of variants with extremely high sensitivity and specificity. The technique may also be highly sensitive, allowing for identification of variants at low frequencies (e.g., 1%). Additionally, embodiments of the present disclosure may allow identification of variants in portions of a data set where alignment of short reads is problematic due to use of distant mate pairs and secondary and/or supplementary alignments to the data set. The methodology may additionally be resilient against interpreting single-point variants as portions of larger variants.

FIG. 1 shows a representation of an assessment network 100. Assessment system 105 may include one or more electronic devices (e.g., storage devices, servers, and/or computers) and may, but not need, reside partly or entirely at a remote server (e.g., a cloud server). Assessment system 105 may facilitate building a data store that includes a set of variants. For example, each variant of the set of variants may be a variant-specific unique data set that includes a set of data points that do not occur elsewhere in a reference data set. A length of the set of data points may be determined to balance between being sufficiently long such that the data set does not occur elsewhere in the reference data set but otherwise to prioritize short data sets (e.g., to increase the yield of matching data reads and improve the speed of subsequent queries using the set of data points). Assessment system 105 may (alternatively or additionally) use the data store to evaluate data sets to detect—for a data set associated with a subject—one, more or any variants in the data set. For example, assessment system 105 may determine—for each variant-specific unique data set—whether the subject's data reads include the variant-specific unique data set.

Notably, this variant-detection technique differs from techniques that rely upon comparing a full data set associated with a subject to a reference data set and then determining what type of variant(s) may explain detected differences. The variant-detection technique that uses a variant-specific unique data set instead starts with the potential variants and then determines whether any of these variants are represented in the data set of the subject.

A complication with this variant-centric approach is that a given set of data points in a data set of a subject may include multiple variants. Thus, particularly for longer variant-specific unique data set, exact matches may potentially not occur. Assessment system 105 may thus use a particular type of technique for defining variant-specific unique data sets and/or for querying a data set associated with a subject that does not require exact matches. For example, an exact match may be required for a portion (e.g., a middle portion) of a given variant-specific unique data set, though a penalty-based approach may be used to assess whether each other portion is sufficiently similar to a corresponding portion of the variant-specific unique data set.

A variant may include, for example, a single data point variant, multiple data point variants, an insertion, deletion, copy, inversion, and/or translocation of data points. Variants may be detected using any of a variety of techniques. The detection and/or assessment may be performed, for example, partly or fully at assessment system 105. The detection and/or assessment may be performed as a comparison against reference data 135. The reference data 135 can be one or more data sets that are considered to and used in a manner that assumes that the reference data set(s) do not include a variant. The reference data 135 may have been generated based on data sets associated with many subjects (e.g., to identify most common data points within each of multiple regions). The assessment system 105 may access the reference data 135 when identifying a variant-specific unique data set. In some instances, the detection and/or assessment is performed in a fully automated manner.

A unique data set detector 140 of the assessment system 105 can be configured to detect each variant within a set of data reads. The unique data set detector 140 can determine a variant-specific unique data set for a particular variant to be a data set that includes the smallest number of data points that are unique enough to not occur at multiple places in the reference data set. The variant-specific unique data set can include the variant and enough context (e.g., adjacent data points) such that the particular variant is likely only to occur in instances where the variant-specific unique data set for the particular variant is detected.

In some instances, to detect a variant-specific unique data set, a data read generated based on an analysis of a material can be aligned to a reference data set from the reference data 135. The reference data set can include (for example) an entire data set or a portion of a data set. The unique data set detector 140 can vary a position and length of a portion of the data read that is considered to be the variant-specific unique data set, so that the variant-specific unique data set can be determined. For example, the unique data set detector 140 can construct a sliding window to determine the exemplary length for the unique portion of the data read. The sliding window can vary between a predefined minimum number of data points (e.g., 20 data points) and a predefined maximum number of data points (e.g., 60 data points) set for the predefined window. A middle, variant-inclusive portion can vary between a predefined minimum number of data points (e.g., 10 data points) and a predefined maximum number of data points (e.g., 16 data points). The sliding window can be positioned at every position of the aligned data set that may include the particular variant. An identification of an ordered set of data points within each sliding window can be defined to be a candidate data set for the variant-specific unique data set. For example, the sliding window can have a middle portion of 10 data points, so the set of candidate data sets can include 41 data sets. In some instances the portion of the sliding window to the left of the middle portion can include a different number of data points than the portion to the right of the middle portion, so the number of candidate data sets with a middle portion of 10 would be higher. The uniqueness for each candidate data set can be quantified by comparing the candidate data set to each of portions of the reference data set that have a length equal to that of the candidate data set. The portions of the reference data set can be defined using a sliding window.

The unique data set detector 140 can rank the candidate data sets based on predefined criteria to determine the exemplary length for the variant-specific unique data set. For example, the criteria can be configured to be satisfied when a candidate data set has the largest number of variant data points (e.g., data points that do not match corresponding data point in the reference data set) included in the variant-inclusive portion to be the variant-specific unique data set. If multiple candidate data sets have the largest number of variant data sets included in the variant-inclusive portion, an alignment count can be determined for the candidate data sets. The alignment count can be the sum of any primary and secondary alignments as determined by an alignment algorithm. A data read may align to multiple locations of the reference data set, and each alignment can be defined as a primary alignment or a secondary alignment. The primary alignment may be arbitrarily defined, or may be based on additional criteria. A length of data points to search for exact matches in the candidate data set compared to the reference data set of 15 data points can be used by the alignment algorithm. Additionally, a maximum number of operations to change the candidate data set into the reference data set ("edit distance") of 3 can be used. If the alignment counts are equal for the candidate data sets, the candidate data set with the largest edit distance of the primary alignment can be the variant-specific unique data set. If the largest edit distance of the primary alignment is equal for multiple candidate data sets, the variant-specific unique data set can be the candidate data set with the largest minimum edit distance of secondary alignments. If this criteria is the same for more than one candidate data set, the variant-specific unique data set can be defined to be the candidate data set with a maximum variant-specific score. The variant-specific score can be determined for +/−150 data points around the variant in the reference data set. The variant-specific score can include scoring of match=1, mismatch=−1, opening a gap (e.g., for insertions and deletions)=−2, extending a gap=−1. This variant-specific score may be stored and used to determine how unique the variant-inclusive portion is in relation to the surrounding data set. A higher variant-specific score may indicate a more unique variant-inclusive portion. A subset of candidate data sets associated with the maximum variant-specific score can be determined. If there is more than one candidate data set in the subset, a shortest candidate data set can be designated the variant-specific unique data set. If each of multiple candidate data sets in the subset have a length equal to a minimum length across candidate data sets in the subset, the candidate data set with a shortest length when repeating data points are collapsed can be designated the variant-specific unique data set. If this remains equal, the variant-specific unique data set can be designated as the candidate data set with a variant-inclusive portion length equal to a minimum variant-inclusive portion length across candidate data sets in the subset. If each of multiple candidate data sets in the subset have a variant-inclusive portion length equal to the minimum variant-inclusive portion length, the variant-specific unique data set can be designated as the candidate data set with a minimum difference in a number of data points between a portion to the left of the variant-inclusive portion and a portion to the right of the variant-inclusive portion. Finally, if each of multiple candidate data sets in the subset have the minimum difference, the variant-specific unique data set can be designated as the candidate data set that is smallest alphabetically. While a specific order and criteria are described, it will be appreciated that any suitable criteria and/or ordering of the criteria may be used to determine the variant-specific unique data set.

In some instances, one or more variant-specific unique data sets can be observed as a result of a single particular variant. For example, some variants may result in a change in a large number of data points (e.g., more than 10) and can be detected and represented by more than one variant-specific unique data set. The portions of the variant-specific unique data sets corresponding to the beginning and end of the variants can be analyzed by the unique data set detector 140 to determine the exemplary lengths for the variant-specific unique data sets.

Once the unique data set detector 140 detects a variant-specific unique data set, the variant-specific unique data set can be stored in data store 130*b*. The data store 130*b* may be remote from or part of the assessment system 105. The data store 130*b* can store multiple variant-specific unique data sets identified by the unique data set detector 140.

Assessment system 105 may receive a request from a client device 110. Client device 110 may be configured and located to be owned by, controlled by or operated by a client 115 and/or to receive input from client 115. Client 115 may be a care-providing entity, such as a physician, nurse, or hospital. In one instance, client device 110 is located in an external facility relative to a location of assessment system 105.

The request may include instructions to conduct a variant analysis on a data set associated with a particular subject. The request may correspond to a particular portion of a data set or a whole data set. The request may identify a subject and/or include additional data pertaining to the subject, such as subject-identifying data (e.g., a name, existing medical condition, and/or potential diagnosis). The request may identify a particular material and/or one or more material characteristics (e.g., type of material).

In some instances, a subject device 120 alternatively or additionally interacts with assessment system 105. Subject device 120 may be owned, operated, controlled and/or used a subject 125 from whom a material being analyzed was collected. In some instances, a subject device 120, associated with subject 125, initially transmits a preliminary electronic request for the analysis and/or assessment to assessment system 105. For example, such a preliminary electronic request may be initiated via interaction with a website associated with assessment system 105. The same or a subsequent preliminary request may identify a particular client (e.g., by name, office location, phone number, and/or email address) and/or may request that a client 115 associated with an internally linked client device 110 submit such a request.

Once the request has been received (e.g., from a client device 110 or subject device 120), assessment system 105 may send an instruction communication. The instruction communication can include, for example, identifying information (e.g., a name and address) of subject 125. The instruction may identify a type of analysis that is to be performed on a material. For example, the instruction may indicate that a data analysis pertaining to a data variant detection is to be performed or a data analysis pertaining to a particular portion of part of the data set is performed. As another alternative or additional example, the instruction may identify a type of material that is to be analyzed. As yet another alternative or additional example, the instruction may identify a type of kit or a technique to be used to collect the material.

In some instances, the instructions are provided (directly or indirectly) to a facility to facilitate collection of a particular type of material. In some instances, the instruction communication may facilitate and/or trigger a physical distribution of a kit for collecting a material to a client address. The kit may include, for example, instructions as to how to collect a material, a container for storing the material, an envelope or package for sending the container and material to be analyzed, and/or information pertaining to an order or type of analysis to be conducted.

A data set pertaining to the material may by generated by one or more facility devices (e.g., a sequencer and/or polymerase chain reaction machine) to identify an ordered set of data points corresponding to all or part of a reference data set. Data generated by or at one or more facility devices may be stored at a data store 130*a*, which may be local to and/or remote from one, some or all facility devices or part of a facility system. The data may, for example, include identifying subject information (e.g., a name and address), facility information (e.g., location and name), device specifications (e.g., manufacturer and model of assessment device), and data sets (e.g., one or more data sequences).

In various instances, facility data may be transmitted to assessment system 105 (e.g., in a batch-mode, in a streaming mode, in real-time as data is produced and/or upon request).

A given transmission or stream may include information that associates each data set (e.g., that identifies a set of data points) with a given subject. In some instances, a data set is generated so as to include each new data read and one or more identifiers (e.g., of a subject, material, time and/or facility device). The data may then be transmitted to assessment system 105. In some instances, data that identifies the data set and the subject may be appended to a stream that is being fed to assessment system 105.

Assessment system 105 may have access to—for a given subject—one or more data sets, client-reported data, and/or other types of data. When the instruction communication is received, the assessment system 105 can access data reads of the material associated with the subject 125 from the data store 130*a*. A criteria evaluator 145 of the assessment system 105 can process each data read to detect any of multiple variant-specific unique data sets in the subject's data set. In some instances, the data reads may be (but need not be) aligned to a particular region of the reference data set before the criteria evaluator 145 processes each data set. In paired-end analysis, data read pairs can include the data read and a mate of the data read. The mate of the data read can be aligned to the particular region of the reference data set. Secondary alignments or supplemental alignments for data read pairs may be used in addition to primary alignments.

For each data read, the criteria evaluator 145 can determine if a first matching criterion is satisfied. The first matching criteria can require (for example) that no more than a maximum number of mismatches exist between data points in the variant-inclusive portion of the variant-specific unique data set and contiguous data points in the data read of the subject 125. For example, the maximum number may be zero and the first matching criterion may be satisfied if there are zero mismatches between the variant-inclusive portion and the contiguous aligned data points in the data read. In some instances, the maximum number may be determined based on the number of data points in the variant-inclusive portion. For example, the maximum number can be defined based on a percentage of data points in the variant-inclusive portion (e.g., 1% of the data points in the variant-inclusive portion). In some examples, a different variant than the variant associated with the variant-specific unique sequence data set may overlap with the variant-inclusive portion. The criteria evaluator 145 can disregard one or more specific positions of the variant-specific unique sequence data set when determining whether the first matching criterion is satisfied. The one or more specific positions that are to be disregarded may be specified by a user based on the variant-specific unique data set previously including another variant in the variant-inclusive portion.

In some instances, the criteria evaluator 145 can also determine if a second matching criterion is satisfied for each data read. The second matching criterion can be defined to require that no more than a maximum number of mismatches are detected, where each mismatch is one between one or more data points in the one or more other portions of the variant-specific unique data set (e.g., adjacent to the variant-inclusive portion) and corresponding one or more data points in one or more other portions of contiguous data points in the data read. The second matching criterion may be less stringent than the first matching criterion. For example, the maximum number of the second criterion (indicating a maximum permitted number of mismatches between the data points in the one or more other portions of the variant-specific unique data set and the data points in the one or more other contiguous portions in the data read) can be higher than that of the first criterion (e.g., one or two permitted mismatches in the second criterion as compared to zero permitted mismatches in the first criterion). In some instances, the maximum number may be determined based on the number of data points in the one or more other portions of the variant-specific unique data set. For example, the maximum number can be determined from a percentage of data points in the one or more other portions (e.g., 2% of data points can mismatch between the one or more other portions of the variant-specific unique data set and the one or more other portions of the data read).

In some instances, the criteria evaluator 145 can determine one or more quality scores for the data read. A quality score can be a confidence that a data point call in the data read is correct. A quality score may be determined for an entire data read and/or a partial data read matching the variant-specific unique data set. The criteria evaluator 145 can determine a quality score for each data read based on the quality score for each data point in the data read. For example, the quality score for each data point may be averaged to determine the quality score for the data read. The one or more quality scores may additionally or alternatively quantify a confidence of mapping the data read, or a data read pair, to a correct location of the reference data set.

In some instances, the criteria evaluator 145 may additionally determine a confidence value for mismatches in each data read (e.g., a confidence in the likelihood that the determined mismatch is accurate). For example, a mismatch may be determined as high confidence (e.g., above 50%) or low confidence (e.g., below 50%). The confidence value may be based on the quality scores. For example, a data point with a low quality score that does not match a corresponding data point in the reference data set may have a lower confidence value. The quality scores of data points that do not match those from the reference data set may matter more than others. In some instances, the first criterion and second criterion may be configured to be satisfied based on the confidence of a mismatch. For example, the first criterion can be a maximum number of one low-confidence mismatch (e.g., a confidence value below 50% for a data point in the data read that does not match the corresponding data point in the reference data set) and zero high-confidence mismatches (e.g., a confidence value above 50% for a data set in the data read that does not match the corresponding data point in the reference data set) and the second criterion can be a maximum number of two low-confidence mismatches and one high-confidence mismatch.

Once the criteria evaluator 145 determines whether the first matching criterion and the second matching criterion are satisfied for each data read, a variant classifier 150 of the assessment system 105 can determine if the data set associated with the subject 125 includes the variant associated with the variant-specific unique data set. The variant classifier 150 may filter data reads that satisfy the matching criteria to meet a minimum quality score (e.g., 0.6). The variant classifier 150 may determine that the data set associated with the subject 125 includes the particular variant based on a quantity of data reads (e.g., filtered or non-filtered data reads) that satisfy the first matching criterion and the second matching criterion. For example, the variant classifier 150 may classify the subject 125 as including the particular variant if at least 10% of the data reads match the first matching criterion and the second matching criterion.

In some instances, the variant classifier 150 can determine the data set associated with the subject 125 includes the particular variant based on a quantity and/or quality of data reads that were aligned to at least part of the particular region of the reference data set and for which the first matching criterion and/or the second matching criterion were not satisfied. For example, the variant classifier 150 can determine that the data set includes the particular variant if a minimum number of data reads that were aligned to the reference data set only satisfy the first matching criterion or the second matching criterion. In some instances, the variant classifier 150 may also or alternatively determine the subject 125 includes the particular variant if a quality score threshold was satisfied for the aligned data reads even if the first matching criterion and/or the second matching criterion were not satisfied. If a particular variant was represented by two variant-specific unique data sets, matching data reads can be data reads that originate from the same portion of the material. For complex variants requiring more than two variant-specific unique data sets for their characterization, supporting data reads may be derived from more than one portion of the material. If overlapping variants are detected in a single material, the largest variant can be retained. This may address the problem of insertions and deletions that are called only partially by variant analyzers.

The filtered data reads can be annotated as "low" or "high" confidence based on the number of data reads containing the variant-specific unique data set. If each data read is aligned to the reference data set, the confidence may additionally or alternatively be determined based on a ratio of supporting data reads divided by the total data read count in the region of interest. In unbiased data set generation, this ratio can also be calculated as a number of data reads containing the variant-specific unique data set divided by a number of data reads supporting the reference data set. The variant classifier 150 may additionally or alternatively determine that the data set includes the particular variant based on the confidence annotations. For example, there can be a minimum threshold for a number of high confidence data reads detected to classify the data set as including the particular variant.

In some instances, the assessment system 105 can query the set of data reads of the data set associated with the subject 125 for multiple variant-specific unique data sets in the data store 130b. The variant-specific unique data sets may correspond to multiple regions of the reference data set. The criteria evaluator 145 can determine if each data read in the set of data reads satisfies multiple matching criteria based on comparing data points in each variant-specific unique data set to data points in the data read. The variant classifier 150 can determine the data set includes one or more particular variants based on a quality and/or quantity of data reads in the set of data reads that satisfy the matching criteria.

In some instances, results of the determination of the variant classifier 150 can be stored as results data 155. The results data 155 can include an association between the subject 125 and one or more variant-specific unique data sets and/or variants included in the data set associated with the subject 125. The results data 155 can additionally include a categorization or classification of each variant associated with the subject 125, such as a likelihood of transitioning into a particular state. The results data 155 can be output to the client device 110 and/or the subject device 120.

In some instances, the material may be a biological sample (e.g., blood or saliva), and the data set associated with the subject 125 can be a genetic sequence of the subject 125. A variant-specific unique data set can be a variant-specific unique sequence that includes a particular genetic variant. Variant-specific unique sequences can be determined by comparing genetic sequences to a reference genomic sequence (e.g., some or all of the reference data 135). The variant-specific unique sequence can be determined from candidate data sets, which can be candidate sequences. Each data point of the variant-specific unique data set, candidate data sets, reference data set, and the data set associated with the subject 125 can correspond to a nucleotide of the variant-specific unique sequence, candidate sequences, reference genomic sequence, and genetic sequence of the subject 125, respectively. Once a set of variant-specific unique sequences are determined and stored in data store 130b, genetic variants included in the genetic sequence of the subject 125 can be determined by evaluating the matching criterion for the genetic sequence.

Figure 2:
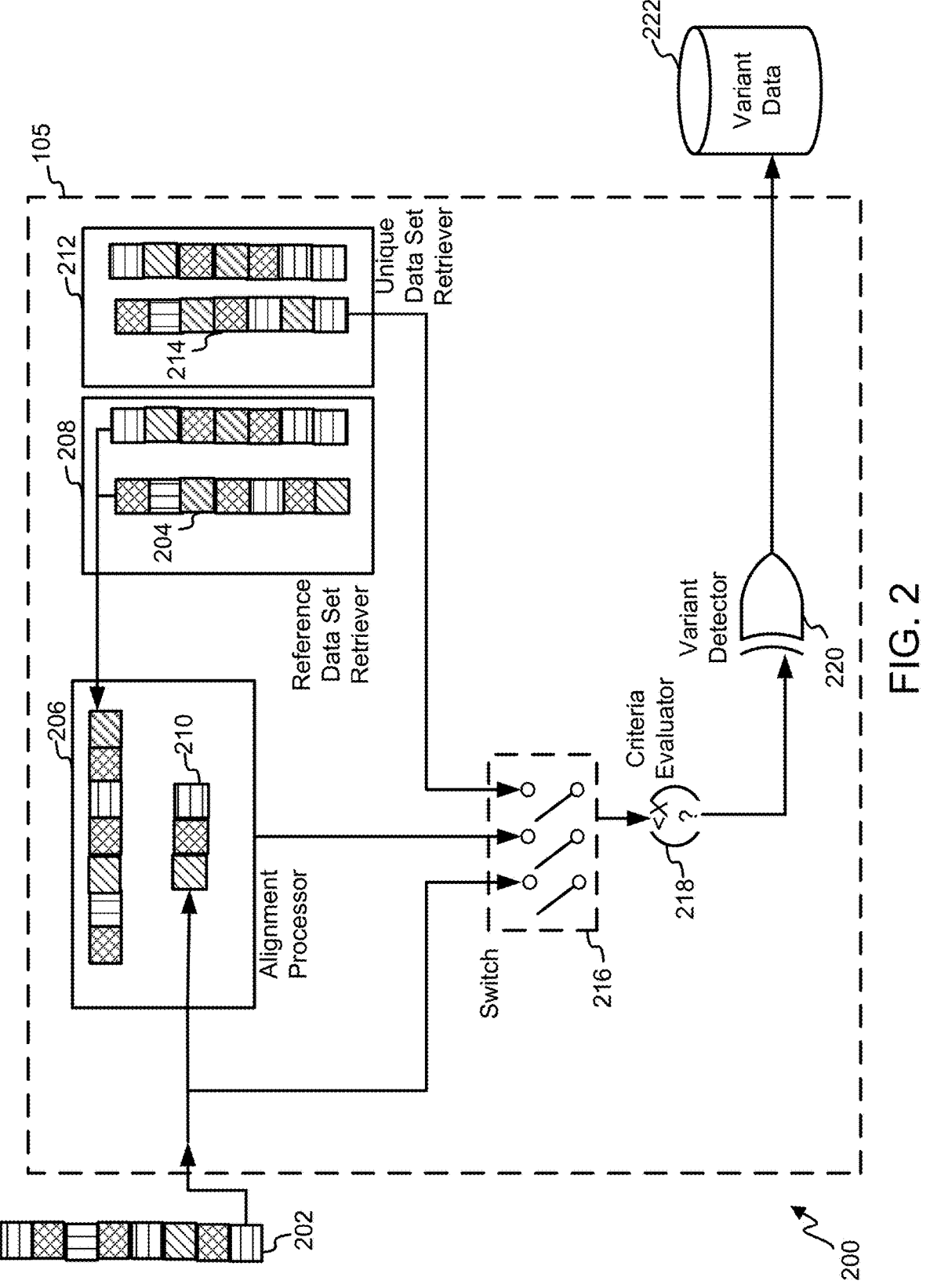
FIG. 2 shows a system for detecting a variant in a data set, in accordance with some embodiments.

FIG. 2 illustrates a system 200 for detecting a variant in generated data set 202 compared to reference data set 204 that does not include the variant. Generated data set 202 may be generated from a material associated with a subject. System 200 may represent portions of assessment system 105 and may, for example, include portions of criteria evaluator 145 and/or variant classifier 150. System 200 may be in data communication with one or more other components of assessment network 100, such as subject device 120 and data stores 130a and 130b, for example.

System 200 includes an alignment processor 206 that can align generated data set 202 to a corresponding portion of reference data set 204. The alignment processor can receive reference data set 204 from a reference data set retriever 208. The alignment processor 206 can align the generated data set 202 and the reference data set 204 to generate aligned data set 210. The alignment may be performed by using an alignment technique. For example, identifiers in the generated data set 202 can be compared to each of a plurality of consecutive identifiers—each being associated with a different portion of reference data set 204.

The system 200 further includes a unique data set retriever 212 that stores and retrieves unique data sets. Each unique data set can be associated with a particular variant. The unique data sets can include a variant-inclusive portion and one or more other portions adjacent to the variant-inclusive portion. The system 200 may determine the generated data set 202 includes a particular variant if the generated data set 202 satisfies matching criteria for unique data set 214.

System 200 includes a switch 216 to control which data a criteria evaluator 218 receives. In some examples, the criteria evaluator 218 can receive the generated data set 202 and the unique data set 214. In other examples, the criteria evaluator 218 can receive the aligned data set 210 and the unique data set 214.

The criteria evaluator 218 can determine if the generated data set 202 satisfies the matching criteria. The criteria evaluator 218 can evaluate a first criterion for a first portion of the generated data set 202. For example, the first criterion can be configured to be satisfied when no more than a maximum threshold for a number of data points in the generated data set 202 are mismatches compared to a contiguous number of data points in the variant-inclusive portion of the unique data set 214. If the criteria evaluator 218 receives the aligned data set 210, the first criterion can be configured to be satisfied when no more than a maximum threshold for a number of data points in the aligned data set 210 are mismatches compared to data points in the unique data set 214 aligned to positions corresponding to the variant-inclusive portion of the unique data set 214. The maximum threshold can be fixed or the maximum threshold can vary based on a number of data points in the variant-inclusive portion of the unique data set 214. For example, the maximum threshold may be higher for a unique data set with a higher number of data points in the variant-inclusive portion than a unique data set with a smaller number of data points in the variant-inclusive portion.

In some instances, the criteria evaluator 218 can additionally evaluate the generated data set 202 for a second criterion. The second criterion can be associated with one or more other portions of the generated data set 202. For example, the second criterion can be configured to be satisfied when no more than a maximum threshold for a number of data points in the generated data set 202 are mismatches compared to one or more other portions of data points of the unique data set 214. If the criteria evaluator 218 receives the aligned data set 210, the second criterion can be configured to be satisfied when no more than a maximum threshold for a number of mismatched data points are detected in the one or more other portions of the unique data set 214 compared to data points aligned to positions corresponding to the one or more other portions in the aligned data set 210. The second criterion can be less stringent than the first criterion.

System 200 can further include a variant detector 220 that can receive an output from the criteria evaluator 218. The output can include an indication of whether the matching criteria were satisfied for the generated data set 202. The variant detector 220 can determine whether the generated data set 202 includes the particular variant associated with the unique data set 214 based on the output from the criteria evaluator 218. For example, the variant detector 220 can determine the generated data set 202 includes the particular variant if the output indicates the first criterion and the second criterion were satisfied.

Variant data 222 can be output by the variant detector 220 and stored for subsequent analysis. For example, multiple related data sets can be generated, and the results of processing each related data set can be stored. In subsequent analysis, the system 200 may determine whether the related data sets include the variant based on a number of the related data sets satisfying the matching criteria.

FIG. 3 demonstrates exemplary results of detecting variants in a data set. The data set is the PMS2 gene, which is one of the Lynch syndrome genes associated with multiple types of hereditary cancer. Variant-specific unique sequences were constructed for variant subtypes which had typically been classified as pathogenic. The variant-specific unique sequences had a minimum length of 20 nucleotides and a maximum length of 60 nucleotides. Each variant-specific unique sequence had a middle, variant-inclusive portion between 10 and 16 nucleotides in length.

Variant-specific unique sequences of single nucleotide variants, insertion/deletion variants, deletion variants, duplication variants, an insertion variant, an inversion variant, and a gene conversion variant (partial conversion of PMS2CL exon 2 into PMS2 exon 11) were constructed. One variant-specific unique sequence was constructed for each single nucleotide variant of the single nucleotide variant subtype and for each insertion/deletion variant of the insertion/deletion variant subtype. Multiple distinct unique sequences were constructed for each deletion variant of the deletion variant subtype, for each duplication variant of the duplication variant subtype, for the large (>50 bp) insertion of the insertion variant subtype, for the inversion variant of the inversion variant subtype, and for the gene conversion variant of the gene conversion variant subtype. The total number of expected instances of each variant subtype is the total variant count. The experiment involved 56 distinct single nucleotide variants and 333 expected single nucleotide variant instances, 42 distinct insertion/deletion variants and 143 expected insertion/deletion variant instances, 53 distinct deletion variants and 102 expected deletion variant instances, 12 distinct duplication variants and 16 expected duplication variant instances, 1 distinct insertion variant and 6 expected insertion variant instances, 1 distinct inversion variant and 5 expected inversion variant instances, and 1 distinct gene conversion variant and 1 expected gene conversion variant instance.

A percentage was calculated for the expected variant instances that were detected based on matching criteria between nucleotides in the experimental samples and the variant-specific unique sequences. The matching criteria was configured to be satisfied when nucleotides in the sample were an exact match for the middle, variant-inclusive portion of the variant-specific unique sequence and there were two or less mismatches in the nucleotides of the sample that correspond to the remaining nucleotides of the variant-specific unique sequence. Each of the expected variant instances were detected for each variant subtype. For the deletion variant subtype, 100% of the 102 expected deletion variant instances were detected, with one of the deletion detected as a low confidence call.

FIG. 4 demonstrates exemplary results of detecting variants in another data set. The data set includes 50 genes associated with hereditary cancer or cardiovascular conditions. One of the genes is the PMS2 gene. Variant-specific unique sequences were constructed for variant subtypes which had typically been classified as pathogenic. The variant-specific unique sequences had a minimum length of 20 nucleotides and a maximum length of 60 nucleotides. Each variant-specific unique sequence had a middle, variant-inclusive portion between 10 and 16 nucleotides in length.

Variant-specific unique sequences of single nucleotide variants, deletion variants, deletion with insertion variants, duplication variants, duplication with insertion variants, insertion variants, and inversion variants were constructed. One or more distinct variant-specific unique sequences were constructed for each variant of the variant subtypes. The total number of expected instances of each variant subtype is the total variant count. The experiment involved 859 distinct single nucleotide variants and 2102 expected single nucleotide variant instances, 394 distinct deletion variants and 720 expected deletion variant instances, 108 distinct deletion with insertion variants and 194 expected deletion with insertion variant instances, 116 distinct duplication variants and 188 expected duplication variant instances, 22 distinct duplication with insertion variants and 638 expected insertion variant instances, 26 distinct insertion variants and 81 expected inversion variant instances, and 6 distinct inversion variants and 18 expected inversion variant instances.

A percentage was calculated for the expected variant instances that were detected based on matching criteria between nucleotides in the experimental samples and the variant-specific unique sequences. The matching criteria was configured to be satisfied when nucleotides in the sample were an exact match for the middle, variant-inclusive portion of the variant-specific unique sequence and there were two or less mismatches in the nucleotides of the sample that correspond to the remaining nucleotides of the variant-specific unique sequence. Over 97% of each of the expected variant instances were detected for each variant subtype, with 100% of the expected variant instances being detected for the duplication variant subtype, the insertion variant subtype, and the inversion variant subtype. In total, 99.61% of the expected variant instances were detected.

In other examples, thirty-two whole genome sequencing (WGS) data sets were analyzed, and all expected variants were correctly identified. In one of the WGS data sets, the variants included four small indel variants, one deletion, one insertion, and one inversion. Each of the calls had a high confidence. In total, 3,514 variant-specific unique data sets were analyzed.

Figure 5:
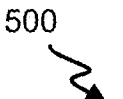
FIG. 5 is an example of a process for defining a variant-specific unique data set for a variant, in accordance with some embodiments.

FIG. 5 is an example of a process 500 for defining a variant-specific unique data set for a variant. Process 500 may be performed in part or in its entirety by, for example, assessment system 105.

At block 505, a variant is defined within a context of a reference data set that encompasses the variant. The reference data set can include a whole reference data set or a portion of the whole reference data set. The variant definition can be generated based on an analysis of a collection of reads from a material. The analysis can be based on a public variant database or scientific literature.

At block 510, shorter candidate data sets for a variant-specific unique data set are generated from the variant definition. The variant-specific unique data set is a length of data points for a particular variant that balances being sufficiently long such that the data set does not occur elsewhere in the whole data set but otherwise to prioritizes short data sets. The candidate data sets are generated using a sliding window with a minimum length of 20 data points and a maximum length of 60 data points. Additionally, a middle portion of the sliding window that includes the particular variant has a minimum length of 10 data points and a maximum length of 16 data points. The sliding window can be positioned at every position of the aligned data set that may include the particular variant. An identification of an ordered set of data points within each sliding window can be defined to be a candidate data set for the variant-specific unique data set.

At block 515, a candidate data set from among the candidate data sets is selected as the variant-specific unique data set. The candidate data set can be selected based on predefined criteria. For example, the predefined criteria can be configured to be satisfied for a candidate data set with a maximum number of data points in the middle portion that do not match corresponding data points in the reference data set. Additionally, the predefined criteria may be configured to be satisfied for a candidate data set with a maximum alignment count, a maximum edit distance for a primary alignment, a minimum edit distance for secondary alignments, and/or a maximum variant-specific score. The candidate data set that satisfies the predefined criteria can be designated as the variant-specific unique data set for the particular variant. In some instances, such as for large variants, multiple candidate data sets can be selected to encompass the variant-specific unique data set. The multiple candidate data sets can be referred to as a collection of unique data sets. In such instances, the collection of unique data sets can be absent from at least a relevant portion of the reference data set. However, the individual candidate data sets of the collection of unique data sets may be present in the reference data set.

At block 520, the variant-specific unique data set, or the collection of unique data sets, is stored. The variant-specific unique data set may be stored in a data store along with other variant-specific unique data sets for other variants. The data store can then be accessed to determine if a data set associated with a subject includes the variant-specific unique data set or any of the other variant-specific unique data sets.

Figure 6:
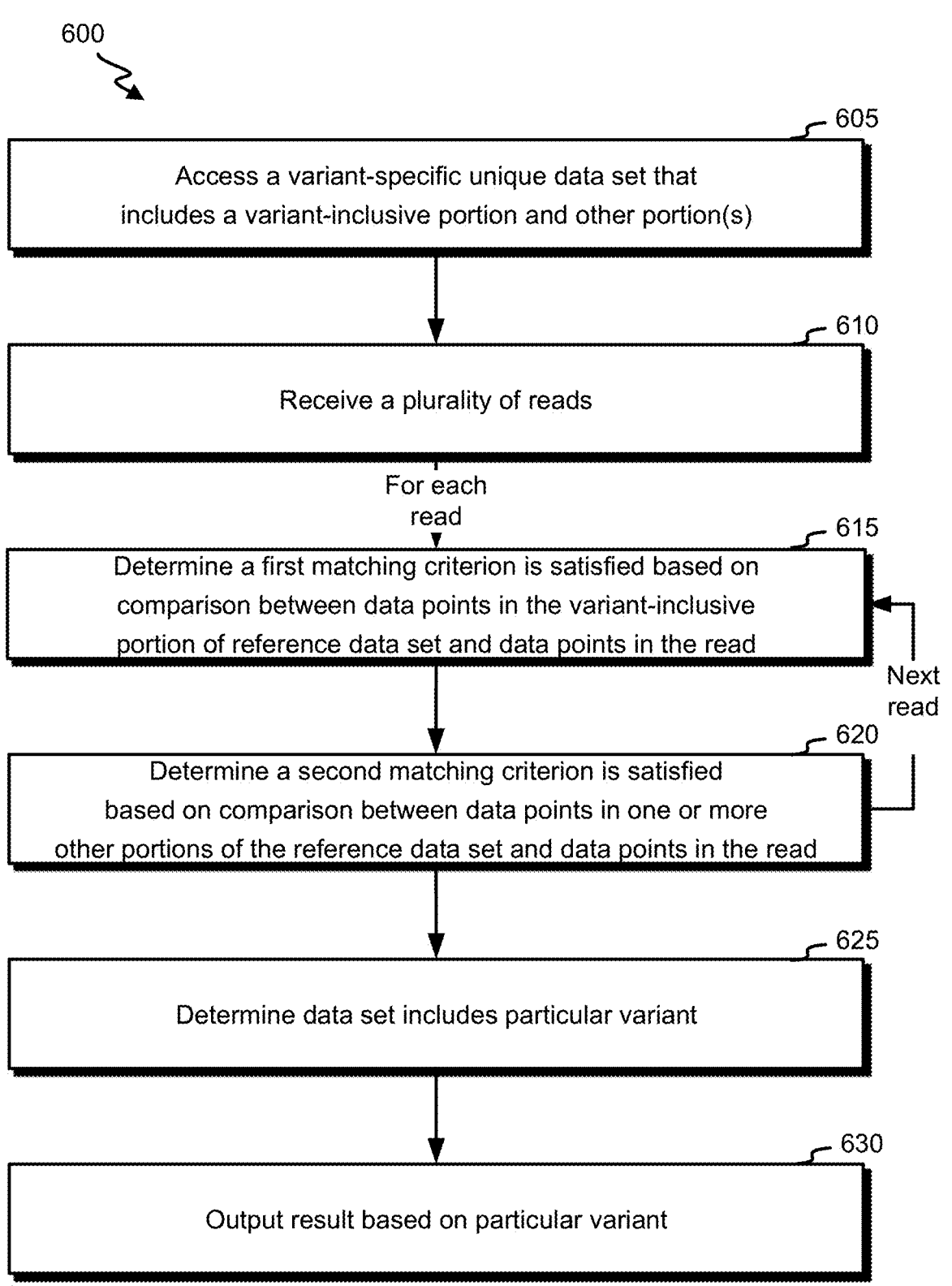
FIG. 6 is an example of a process for detecting a variant in a data set, in accordance with some embodiments.

FIG. 6 is an example of a process 600 for detecting a variant in a data set. Process 600 may be performed in part or in its entirety by, for example, assessment system 105.

At block 605, a variant-specific unique data set that includes a variant-inclusive portion and other portion(s) is accessed. The variant-inclusive portion can include a particular variant and can be between 10 and 16 data points in length. The total length of the variant-specific unique data set can be determined prior to the variant-specific unique data set being accessed.

At block 610, a plurality of reads are received. Each read can be generated by processing a material, such as a sample, collected from a subject. A portion of each read can correspond to at least a portion of the variant-specific unique data set.

Blocks 615 and 620 can be performed for each read of a subset of the plurality of reads. At block 615, a first matching criterion is determined to be satisfied based on a comparison between data points in the variant-inclusive portion of the reference data set and data points in the read. The first matching criterion can be configured to be satisfied when no more than a first maximum number of mismatches are detected between data points in the variant-inclusive portion of the variant-specific unique data set and contiguous data points in the read. For example, the first maximum number may be zero, and the first matching criterion may be satisfied if there are zero mismatches between the variant-inclusive portion and the corresponding contiguous data points in the read. In some instances, the first maximum number may be determined based on the number of data points in the variant-inclusive portion.

At block 620, a second matching criterion is determined to be satisfied based on a comparison between data points in the one or more other portions of the reference data set and data points in the read. The second matching criterion can be configured to be satisfied when no more than a second maximum number of mismatches are detected between data points in the one or more other portions of the variant-specific unique data set (e.g., adjacent to the variant-inclusive portion) and one or more other portions of corresponding data points in the read. The second matching criterion may be less stringent than the first matching criterion, and/or the second maximum number may be greater than the first maximum number. For example, the second maximum number can be two, and the second criterion may be satisfied if there are two or less mismatches between the data points in the one or more other portions of the variant-specific unique data set and the data points in the one or more other contiguous portions in the read. In some instances, the second maximum number may be determined based on the number of data points in the one or more other portions of the variant-specific unique data set.

At block 625, the data set is determined to include the particular variant. The determination may be based on a quantity (e.g., a number or percentage) of the reads for which the first matching criterion and the second matching criterion are satisfied. Additionally or alternatively, the determination may be based on a confidence value for the reads including the particular variant. The data set can be determined to include the particular variant if at least a minimum number of reads have a high confidence value and/or a maximum number of reads or less have a low confidence value.

At block 630, a result based on the particular variant is output. The result can include an indication of the particular variant. The result may additionally include an indication of a likelihood of transitioning to a state associated with the particular variant and a mitigation operation for the subject based on the likelihood of transitioning to the state.

While the principles of the disclosure have been described above in connection with specific apparatuses and methods, it is to be clearly understood that this description is made only by way of example and not as limitation on the scope of the disclosure. Further, it is appreciated that various disclosed embodiments may be combined.

What is claimed is:

1. A method for variant detection comprising:
   accessing a variant-specific unique data set, wherein the variant-specific unique data set includes a variant-inclusive portion that includes a particular variant and one or more other portions, wherein the variant-specific unique data set corresponds to a particular region of a reference data set;
   receiving a plurality of reads, each read of the plurality of reads having been generated by processing a material collected from a subject, wherein a data set pertaining to the material is generated by one or more facility devices to identify an ordered set of data points corresponding to the reference data set, and the variant-specific unique data set includes the set of data points;
   determining a length of the set of data points such that the data set does not occur elsewhere in the reference data set;
   for each read of a subset of the plurality of reads:
      generating multiple matching metrics that indicate whether or an extent to which data points in at least part of the variant-specific unique data set and a corresponding contiguous plurality of data points in the read match, wherein the multiple matching metrics correspond to different at least parts of the variant-specific unique data set;
   determining a data set associated with the subject includes the particular variant based on a quantity of reads having a threshold confidence value in the subset; and
   outputting a result identified based on the particular variant.

2. The method of claim 1, further comprising identifying a length range for the variant-inclusive portion and for each of the one or more other portions.

3. The method of claim 1, wherein the variant-specific unique data set is unique in that the reference data set does not include the variant-specific unique data set.

4. The method of claim 1, wherein the determination that the data set associated with the subject includes the particular variant is further based on a quantity and/or quality of reads that were aligned to the at least part of the variant-specific unique data set that corresponds to one of the multiple matching metrics.

5. The method of claim 1, wherein data points in a first at least part of the variant-specific unique data set that corresponds to a first matching metric of the multiple matching metric are an incomplete subset of data points in a second at least part of the variant-specific unique data set that corresponds to a second matching metric of the multiple matching metric.

6. The method of claim 5, wherein the first matching metric is more stringent than the second matching metric in that the second matching metric permits more mismatches than does the first matching metric.

7. The method of claim 1 further comprising, prior to accessing the variant-specific unique data set, defining the variant-specific unique data set by:
   detecting a variant within a portion of the reference data set based on an analysis of an additional material;

generating a plurality of candidate data sets for the variant-specific unique data set from the variant, wherein each of the plurality of candidate data sets includes a representation of at least part of the variant, and wherein each candidate data set of the plurality of candidate data sets differ from other candidate data sets in the plurality of candidate data sets with respect to a number of data points included in each of one or more portions of the candidate data set;

selecting a candidate data set among the plurality of candidate data sets as the variant-specific unique data set based on predefined criteria; and storing the variant-specific unique data set.

8. A system comprising:

one or more data processors; and a non-transitory computer readable storage medium containing instructions which, when executed on the one or more data processors, cause the one or more data processors to perform a set of actions including:

accessing a variant-specific unique data set, wherein the variant-specific unique data set includes a variant-inclusive portion that includes a particular variant and one or more other portions, wherein the variant-specific unique data set corresponds to a particular region of a reference data set;

receiving a plurality of reads, each read of the plurality of reads having been generated by processing a material collected from a subject, wherein a data set pertaining to the material is generated by one or more facility devices to identify an ordered set of data points corresponding to the reference data set, and the variant-specific unique data set includes the set of data points;

determining a length of the set of data points such that the data set does not occur elsewhere in the reference data set;

for each read of a subset of the plurality of reads:

generating multiple matching metrics that indicate whether or an extent to which data points in at least part of the variant-specific unique data set and a corresponding contiguous plurality of data points in the read match, wherein the multiple matching metrics correspond to different at least parts of the variant-specific unique data set;

determining a data set associated with the subject includes the particular variant based on a quantity of reads having a threshold confidence value in the subset; and outputting a result identified based on the particular variant.

9. The system of claim 8, wherein the set of actions further includes identifying a length range for the variant-inclusive portion and for each of the one or more other portions.

10. The system of claim 8, wherein the variant-specific unique data set is unique in that the reference data set does not include the variant-specific unique data set.

11. The system of claim 8, wherein the determination that the data set associated with the subject includes the particular variant is further based on a quantity and/or quality of reads that were aligned to the at least part of the variant-specific unique data set that corresponds to one of the multiple matching metrics.

12. The system of claim 8, wherein data points in a first at least part of the variant-specific unique data set that corresponds to a first matching metric of the multiple matching metric are an incomplete subset of data points in a second at least part of the variant-specific unique data set that corresponds to a second matching metric of the multiple matching metric.

13. The system of claim 12, wherein the first matching metric is more stringent than the second matching metric in that the second matching metric permits more mismatches than does the first matching metric.

14. The system of claim 8, wherein the set of actions further includes, prior to accessing the variant-specific unique data set, defining the variant-specific unique data set by:

detecting a variant within a portion of the reference data set based on an analysis of an additional material;

generating a plurality of candidate data sets for the variant-specific unique data set from the variant, wherein each of the plurality of candidate data sets includes a representation of at least part of the variant, and wherein each candidate data set of the plurality of candidate data sets differ from other candidate data sets in the plurality of candidate data sets with respect to a number of data points included in each of one or more portions of the candidate data set;

selecting a candidate data set among the plurality of candidate data sets as the variant-specific unique data set based on predefined criteria; and storing the variant-specific unique data set.

15. A computer-program product tangibly embodied in a non-transitory machine-readable storage medium, including instructions configured to cause one or more data processors to perform a set of actions including:

accessing a variant-specific unique data set, wherein the variant-specific unique data set includes a variant-inclusive portion that includes a particular variant and one or more other portions, wherein the variant-specific unique data set corresponds to a particular region of a reference data set;

receiving a plurality of reads, each read of the plurality of reads having been generated by processing a material collected from a subject, wherein a data set pertaining to the material is generated by one or more facility devices to identify an ordered set of data points corresponding to the reference data set, and the variant-specific unique data set includes the set of data points;

determining a length of the set of data points such that the data set does not occur elsewhere in the reference data set;

for each read of a subset of the plurality of reads:

generating multiple matching metrics that indicate whether or an extent to which data points in at least part of the variant-specific unique data set and a corresponding contiguous plurality of data points in the read match, wherein the multiple matching metrics correspond to different at least parts of the variant-specific unique data set;

determining a data set associated with the subject includes the particular variant based on a quantity of reads having a threshold confidence value in the subset; and outputting a result identified based on the particular variant.

16. The computer-program product of claim 15, wherein the set of actions further includes identifying a length range for the variant-inclusive portion and for each of the one or more other portions.

17. The computer-program product of claim 15, wherein the variant-specific unique data set is unique in that the reference data set does not include the variant-specific unique data set.

18. The computer-program product of claim 15, wherein the determination that the data set associated with the subject includes the particular variant is further based on a quantity and/or quality of reads that were aligned to the at least part of the variant-specific unique data set that corre- sponds to one of the multiple matching metrics.

19. The computer-program product of claim 15, wherein data points in a first at least part of the variant-specific unique data set that corresponds to a first matching metric of the multiple matching metric are an incomplete subset of data points in a second at least part of the variant-specific unique data set that corresponds to a second matching metric of the multiple matching metric.

20. The computer-program product of claim 19, wherein the first matching metric is more stringent than the second matching metric in that the second matching metric permits more mismatches than does the first matching metric.

* * * * *